FIG. I.

INVENTOR.
LESTER H. WOLGAST

United States Patent Office 3,387,210
Patented June 4, 1968

3,387,210
METHOD AND APPARATUS FOR MEASURING THE RESISTANCE OF AN ELECTROCHEMICAL CELL
Lester H. Wolgast, Portland, Oreg., assignor to Reynolds Metals Company, Richmond, Va., a corporation of Delaware
Filed Sept. 25, 1964, Ser. No. 399,403
12 Claims. (Cl. 324—64)

---

ABSTRACT OF THE DISCLOSURE

Method and apparatus for measuring resistance between the anode and cathode of an electrochemical cell. A function generator is used to produce a signal that is inversely proportional to cell current, and that signal is delivered to a first pair of Hall effect device input terminals. A portion of the cell's voltage drop ($E_k$) due to its electrochemical reaction is determined to be that which corresponds to the zero-current intercept of a line which is tangent to the characteristic current-voltage curve of the cell in the region of its normal current load. A control voltage generator is used to produce a signal which is proportional to the total voltage drop across the cell minus the $E_k$ voltage drop. The control voltage signal is delivered to the magnetic input terminals of the Hall effect device which functions to multiply the control voltage signal by the inverse current signal to produce an output signal which is proportional to the cell resistance. The Hall device's output signal may then be delivered to a meter which is calibrated to indicate resistance; or to a mechanism which adjusts the anode position to maintain a predetermined resistance between the anode and cathode.

---

This invention relates to apparatus for measuring the resistance of electrolytic cells. More specifically, this invention relates to electrical apparatus for measuring the resistance between the cathode and movable anode of an alumina reduction electrolytic cell although the invention is not limited to use in alumina reduction cells. The measured resistance for each individual cell is displayed to provide a visual guide for adjusting the movable anode to its optimum position with respect to the cathode.

Aluminum metal is conventionally produced by the electrolytic decomposition of alumina in a molten bath of alumina and cryolite contained in an electrolytic reduction cell (or pot as it is usually called). In such a process, current is passed through the bath between a conductive carbon lining serving as the cathode of the cell and a conductive carbon anode partially immersed in the bath. Aluminum metal deposits at the cathode and oxygen is released at the anode. At the high temperature prevailing, the oxygen combines with the carbon of the anode. The anode therefore is mounted on jacks so that it may be lowered into the bath as it is consumed by oxidation, thus permitting a substantially constant distance to be maintained between the anode and cathode. In this manner the bath resistance to the flow of current through the cell, and the amount of current which flows through the cell, are both held at substantially constant values by periodic adjustment of the jacks.

The U.S. patent to Wolgast 2,742,610 discloses cell resistance measuring apparatus comprising a number of tubes, and the U.S. patent to Lunborg 2,918,421 discloses apparatus for measuring cell resistance comprising motor operated potentiometers. While these devices perform as expected, the instant device is a vast improvement in that no moving parts or tubes are required, the device is economical to produce, and it continuously displays individual cell resistance for the convenience of the potline operator.

The primary object of this invention is to provide means for gauging the required adjustment of the anode of an electrolytic cell by indicating the value of the cell resistance.

A further object is to provide electrical apparatus for measuring the resistance between the cathode and movable anode of an alumina reduction electrolytic cell.

Yet another object of this invention is to provide an output signal proportional to cell resistance that is electrically isolated from the electrical potentials of the several cells in a potline.

Other objects and advantages will clearly appear from a description of a preferred embodiment as shown in the accompanying drawings, in which:

FIG. 1 schematically shows the elements of my resistance meter connected to the individual cells in a potline.

In general the objects are achieved by the provision of electrical circuits which compensate for those portions of the total voltage drop through the cell due to the electro-chemical reaction taking place in the cell, and which utilize the voltage after such compensation has been made to indicate the resistance of the electrolytic cell.

Figure 2:
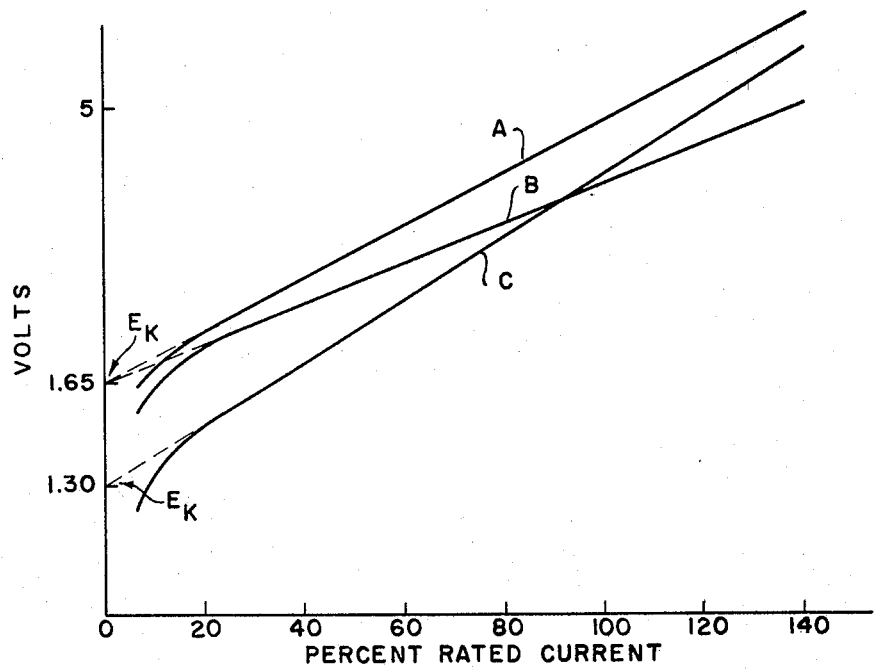
FIG. 2 depicts curves of current versus voltage of different types of cells.

The total voltage applied across the terminals of an alumina reduction cell is shown in FIG. 2 in which curves A and B are current-voltage tracings for a 60,000-ampere prebaked, or multiple carbon, anode cell for two different anode to cathode spacings, and curve C is a current-voltage trace for a 125,000-ampere Soderberg, or continuous anode, cell. Extensions of the straight-line portions of curves A and B to zero current are seen to intersect at a common point $E_k$ on the zero-current axis. Curve C for the Soderberg cell has the same form as curves A and B but gives a smaller value of $E_k$. The total voltage across the cell is seen to consist of the voltage $E_k$, and a true resistive voltage corresponding to a resistance equal to the slope, $\Delta E/\Delta I$, of the appropriate current-voltage trace.

The cell resistance is composed of the substantially fixed resistance of the anode and cathode and associated electrical connections, and the somewhat variable resistance of the electrolytic bath between the anode and cathode. The value of $E_k$ is substantially constant for a given cell, being about 1.65 volts for a prebake cell with an anode comprising a plurality of relatively small carbon blocks and around 1.3 volts for a large Soderberg cell with an anode comprising a single block of carbon 5 feet wide by 30 feet long. The bath resistance, however, tends to increase as the bottom of the anode burns away and widens the spacing between anode and cathode, and in consequence the current through the cell tends to diminish. It is therefore necessary to adjust the position of the anode, either continuously or from time to time, to maintain the bath resistance substantially constant at an optimum predetermined value.

Heretofore it has been common practice to adjust the position of the anode with respect to the cathode to secure a predetermined over-all voltage drop through the cell. This voltage drop is a function of the current flowing through the cell, and such current may (and frequently does) change during the adjustment of the anode position. It is therefore preferable to make the anode adjustment to maintain a predetermined value of cell resistance. The present invention provides means for determining the cell resistance at any moment and gauging the anode adjustment accordingly.

Ordinarily a number of cells are connected in series and it is advantageous to locate the cell resistance meter adjacent each cell so that the resistance value of each cell is available to the operator at all times. A Hall multiplier cell is preferred as it is relatively inexpensive, rugged, has no moving parts, and the terminals and internal circuitry are easily insulated to isolate the resistance measuring system from the 300 to 400 volts potential of the reduction cell with respect to ground. The Hall multiplier cell is also small enough to be fitted within a small extension of the case of the meter. A sealed unit scarcely larger than many of the cell voltmeters currently in use, comprising the voltage subtraction means, the Hall multiplier cell, and the meter means can be positioned at each cell for easy reference by the cell operator. If desired the multiplier output signal may also be displayed in a central control room or supplied to any suitable computer means used for substantially continuous automatic positioning of the anode.

Figure 1:
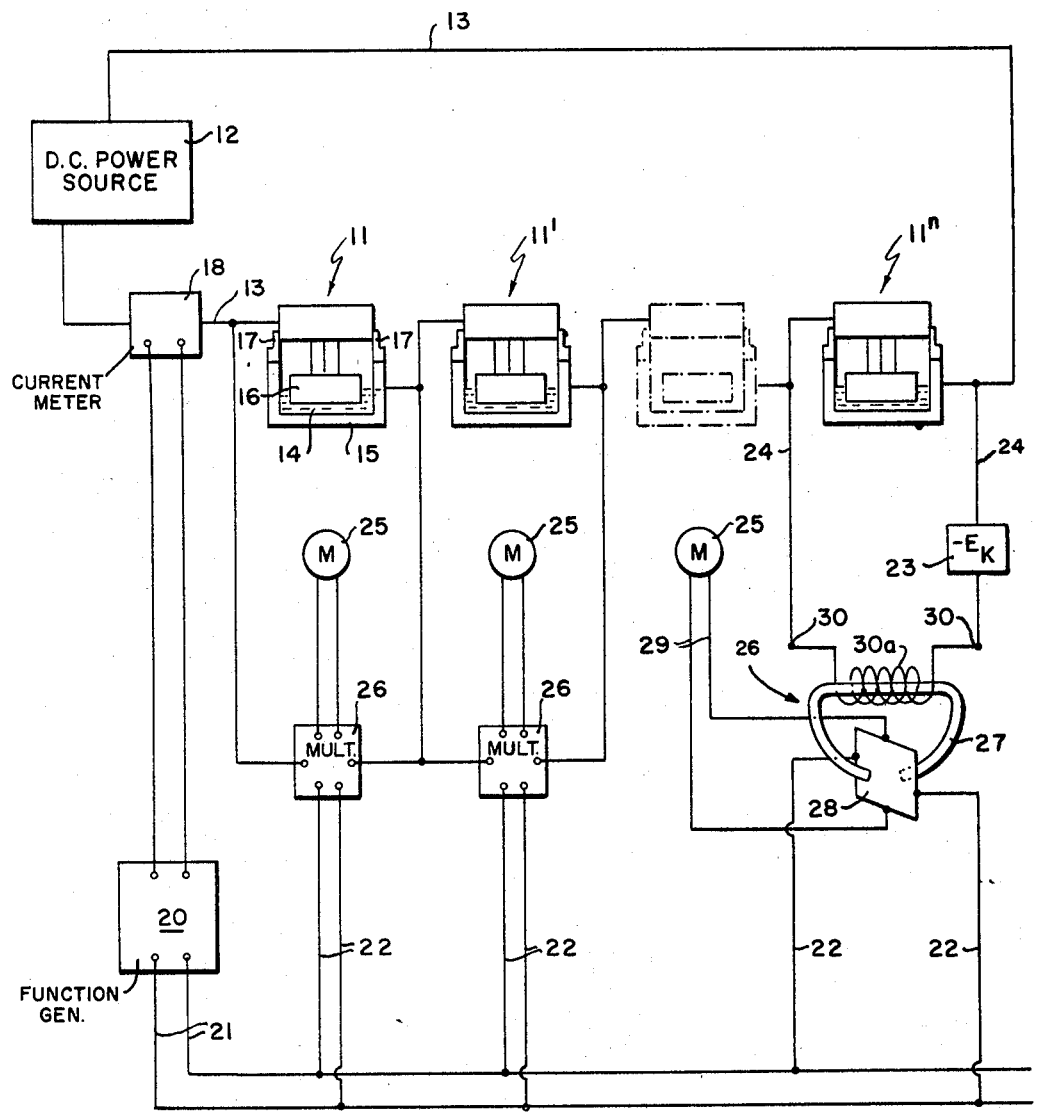

Turning now to FIG. 1 and preferred embodiment of this invention, a number of electrolytic cells $11, 11', \ldots 11^n$ are connected in series (in what is commonly called a potline) to a primary source 12 of direct current power by a power line 13. Each cell contains a molten electrolytic bath 14 of alumina and cryolite in a carbon-lined pot 15, the carbon lining of which serves as the cathode of the cell. Immersed in the electrolytic bath 14 is a carbon anode 16 supported by a frame which is mounted on jacks 17. Current from the power source 12 flows serially through the anode 16, the bath 14, and the cathode 15 of each cell.

Current-metering means 18, which may comprise an accurately calibrated shunt or magnetic amplifier or other suitable means, supplies a first signal proportional to the current flowing in power line 13 to a suitable function generator 20 which inverts the first signal and provides as an output a second signal proportional to the reciprocal of the current $(1/I)$ flowing in power line 13. The second signal is applied to a pair of first input terminals of each of the Hall multipliers 26 by conductors 21 and 22.

The potential E appearing across, for example, pot $11^n$, is transmitted by conductors 24, one conductor 24 having a voltage substraction means 23 therein, to a second pair of Hall cell terminals 30 connected across a coil $30a$. The voltage subtraction means 23 reduces the voltage across second input terminals 30 by an amount equal to a predetermined value of $E_k$ whereby the voltage appearing across the coil $30a$ is proportional to $E-E_k$.

The voltage across coil $30a$ produces a magnetic flux around the magnetic circuit 27 proportional to $E-E_k$ and passing through the Hall crystals 28. The magnetic circuit 27 is electrically insulated against 1500 volts thereby effectively isolating the Hall cell crystal 28 from substantially all transient and steady potentials with respect to ground that may appear in power line 13. The magnetic circuit 27 may also be protected, if desired, against extreme voltages appearing across pot $11^n$ by connecting across terminals 30 or across conductors 24 at the cell a suitable voltage clamping means whereby the maximum potential across terminals 30 is limited to two or three times the normally expected potential.

Hall cell crystal 28 is electrically connected with said first input terminals receiving the signal output, $1/I$ of the function generator 20. The magnetic flux from coil $30a$ through the crystal, being at right angles to the current across the crystal from generator 20, produces a voltage across the crystal in a direction at right angles to both the signal current and the magnetic flux in accordance with the well known Hall effect. This output voltage on conductors 29 is proportional to the product of the signal and the magnetic flux and hence proportional to the product of $E-E_k$ and $1/I$ where is is the current. A suitable meter 25 is connected to the conductors 29 for measuring this variable voltage output. While the meter is a voltmeter it is preferably calibrated in terms of resistance, usually micro-ohms for large alumina reduction cells, so that the total resistance of the cell may be read directly. If desired meter 25 may include a variable zero-setting means whereby said meter may be set to read zero for a voltage signal in conductors 29 equivalent to the sum of the relatively fixed resistance in the anode and cathode and electrical connections in electrochemical cells $11^n$, whereby the resistance reading of the meter 25 will correspond to the variable resistance of the electrolyte in cell $11^n$.

Figure 3:
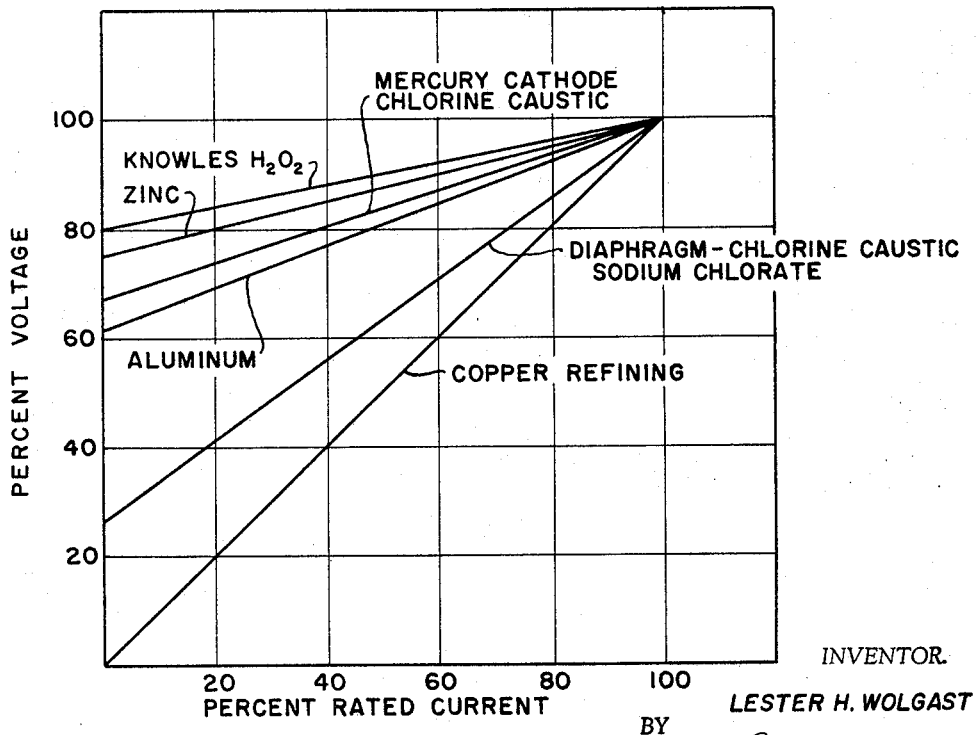
FIG. 3 depicts the voltage-ampere characteristics of an electrolytic cell line for producing diverse materials.

FIG. 3 shows representative voltage-current relations for a number of different electrochemical cells including alumina reduction cells, according to the committee report on Electrical Characteristics of Electrochemical Cell Lines, Transactions Paper No. 61–944, American Institute of Electrical Engineers, New York, N.Y., published July 5, 1961. The curve for each of these electrochemical cells a characteristic value of $E_k$ which is readily determined at the intersection with the zero-current axis of a straight line drawn contiguously with the substantially straight line portion of the voltage-current trace in the vicinity of the cell's rated operating current, as illustrated in FIG. 2 for alumina reduction cells. It is obvious that this invention is not restricted to alumina reduction cells but is applicable also to those electrochemical cells enumerated on FIG. 3 and to those other electrochemical cells for which the voltage-current trace is a substantially straight line in the vicinity of the cell's rated current.

While for purposes of description I have shown and described a specific embodiment of my invention, it will be apparent that changes and modifications can be made therein without departing from the spirit of my invention or the scope of the appended claims.

I claim:

1. A device for measuring the resistance between the anode and the cathode of an electrochemical cell having a DC power source for applying current thereacross, comprising:

a current function generator in circuit with said anode and cathode for generating a current function signal inversely proportional to the current flowing through said electrochemical cell;

voltage generating means for generating a control voltage signal representing the difference between the total voltage drop across said electrochemical cell and the voltage drop due to the electrochemical reaction taking place in the electrochemical cell;

a multiplier;

means for delivering said current function signal to said multiplier; and means for delivering said control voltage signal to said multiplier; said multiplier being operative in response to said control voltage signal and said current function signal to produce an output signal proportional to cell resistance.

2. The apparatus of claim 1 wherein said multiplier is a Hall cell having a current input portion and a magnetic input portion, said current function signal being delivered to said current input portion of said Hall cell and said control voltage signal being delivered to said magnetic input portion of said Hall cell.

3. The apparatus of claim 1 including an indicating meter and means to deliver the output signal of the multiplier to said meter so that said meter provides an indication of the multiplication of said control voltage signal and said current function signal.

4. The apparatus of claim 3 wherein the total voltage drop across the electrochemical cell includes that due to electrolyte and that due to electrodes and electrical connections, said device further including:

means for reducing the meter indication by an amount proportional to the voltage drop due to said electrodes and electrical connections whereby said meter indication is proportional to the voltage drop due to said electrolyte.

5. Apparatus according to claim 1 including anode adjusting means and means for delivering the multiplier output signal to such anode adjusting means which is operative in response to said multiplier output signal to adjust the anode-cathode spacing so as to maintain a predetermined value of resistance between said anode and said cathode.

6. Apparatus according to claim 1 wherein said multiplier is a Hall cell having a current signal input portion and a magnetic input portion, said signal that is inversely proportional to the current flowing through said electrochemical cell being delivered to said current signal input portion of said Hall cell and said control voltage signal being delivered to said magnetic input portion of said Hall cell.

7. Apparatus according to claim 6 including an indicating meter and means to deliver the Hall cell output signal to said meter so that said meter provides an indication of the resistance between said anode and said cathode.

8. Apparatus according to claim 7 wherein the resistance between said anode and cathode includes that of the electrolyte and that of the electrodes and electrical connections, said device further including:
    means for reducing the meter indication by an amount proportional to the resistance of said electrodes and electrical connections whereby said meter indication is proportional to the resistance of said electrolyte.

9. A method of measuring the resistance of an electrochemical cell having a direct current power source for applying current thereacross, comprising the steps of:
    determining the voltage drop across said electrochemical cell due to the electrochemical reaction taking place therein;
    generating a control voltage signal representing the difference between the total voltage drop across said electrochemical cell and said voltage drop due to the electrochemical reaction;
    generating a current function signal inversely proportional to the current flowing through the electrochemical cell; and
    combining the control voltage signal and the current function signal to produce a signal representing the resistance of the electrochemical cell.

10. The method of claim 9 wherein the step of determining the voltage drop due to the electrochemical reaction includes the steps of:
    determining a characteristic current-voltage curve for the electrochemical cell;
    determining the normal current loading of the electrochemical cell;
    establishing a line tangent to the characteristic current-voltage curve at a point on the curve corresponding to the normal current loading; and
    selecting the voltage drop due to the electrochemical reaction as being that corresponding to the intercept of the tangent line with the zero current axis of the characteristic current-voltage curve.

11. The method of claim 9 including the step of delivering the signal representing the resistance of the electrochemical cell to an indicating meter for indicating the resistance of the electrochemical cell.

12. The method of claim 9 including the steps of:
    delivering the signal representing the resistance of the electrochemical cell to an anode adjusting means; and
    adjusting the position of the electrochemical cell's anode in accordance with the resistance signal to maintain the resistance of the electrochemical cell at a predetermined value.

References Cited

UNITED STATES PATENTS

| 2,545,411 | 3/1951 | Perret-Bit | 209—225 |
| 2,742,610 | 4/1956 | Wolgast | 324—62 |
| 3,213,542 | 10/1965 | Murtland | 324—45 |

FOREIGN PATENTS

| 608,242 | 11/1960 | Canada. |
| 128,076 | 1960 | U.S.S.R. |

RUDOLPH V. ROLINEC, *Primary Examiner.*

E. E. KUBASIEWICZ, *Assistant Examiner.*